United States Patent [19]

Komori et al.

[11] Patent Number: 5,179,965
[45] Date of Patent: Jan. 19, 1993

[54] APPARATUS FOR FORMING MICRO-HOLES ON CYLINDRICAL OBJECTS

[75] Inventors: Mikio Komori; Kazuyu Adachi; Shuichi Sato, all of Tokyo, Japan

[73] Assignee: Japan Tobacco Inc., Tokyo, Japan

[21] Appl. No.: 624,316

[22] Filed: Dec. 7, 1990

[30] Foreign Application Priority Data

Dec. 8, 1989 [JP] Japan .................. 1-317562

[51] Int. Cl.$^5$ .......................... A24C 5/00; A24B 7/14
[52] U.S. Cl. ..................................... 131/281; 131/904; 219/121.61; 219/121.62; 219/121.7; 219/121.77
[58] Field of Search ............... 131/281, 904, 907, 910; 219/121.61, 121.62, 121.67, 121.7, 121.71, 121.77

[56] References Cited

U.S. PATENT DOCUMENTS

| | | | |
|---|---|---|---|
| 4,121,595 | 10/1978 | Heitmann et al. | 131/910 X |
| 4,689,482 | 8/1987 | Horikawa et al. | 219/121.61 X |
| 4,720,619 | 1/1988 | Mattei et al. | 131/281 X |
| 4,767,909 | 8/1988 | Okumoto | 131/281 X |
| 4,860,773 | 8/1989 | Okumoto et al. | |
| 4,916,272 | 4/1990 | Okumoto et al. | |
| 4,955,398 | 9/1990 | Milner et al. | 131/904 X |
| 5,018,539 | 5/1991 | Gamberini et al. | 131/907 X |

FOREIGN PATENT DOCUMENTS

| | | |
|---|---|---|
| A292666 | 11/1988 | European Pat. Off. |
| 2403034 | 4/1979 | France. |
| 61-92793 | 10/1986 | Japan. |
| 2098050 | 4/1982 | United Kingdom. |

Primary Examiner—V. Millin
Assistant Examiner—J. Doyle

[57] ABSTRACT

In an apparatus for forming micro-holes on a cigarette, a laser beam is divided into first and second laser beams by a two-dividing mirror. Parts of the laser beams are detected by photo detectors, respectively and the other parts of the laser beams are guided to polyhedron mirrors through first and second optical paths and divided into segment beams by the mirrors, respectively. The segments beams are focused on the corresponding cigarette so that micro-holes are formed on the cigarette. The cigarette is transferred to a dilution detection stage and the dilution is detected in mode, detection signals from the photodetector are processed and a first driving signal is generated. Thus, the two-dividing mirror is driver by a driving mechanism in accordance with the first driving signal so that the intensity of the laser beams guided in the first and second optical paths are maintained in substantially equal level. In an stable driving mode, a second driving signal which is determined in accordance with the detected dilution is applied to the driving mechanism in stead of the first driving signal so that the two-dividing mirror is a driven in accordance with the second driving signal.

41 Claims, 7 Drawing Sheets

APPARATUS FOR FORMING MICRO-HOLES ON CYLINDRICAL OBJECTS

BACKGROUND OF THE INVENTION

1. Field of the Invention

The present invention relates to an apparatus for forming micro-holes on the outer circumference of the filtered section of a cigarette and, more particularly, it relates to an improvement of a system for controlling the apparatus to maintain the size of the micro-holes constant.

2. Description of the Related Art

In the case of some kinds of the filtered cigarettes, a plurality of micro-holes are formed on the outer circumference of the filtered section of each of the cigarettes. These cigarettes allow a large amount of air to be sucked into them when they are lit and smoked, thereby giving the smoker a lighter taste, diluting the smoke sucked into the mouth of the smoker, lowering the temperature of the smoke sucked, and reducing the amount of harmful components contained in the smoke.

The apparatus for forming the micro-holes on the cigarette is therefore incorporated into the cigarettes manufacturing apparatus. In the case of this micro-hole forming apparatus, a focused laser beam which has a certain light intensity is aimed at the cigarettes to form plural holes on the outer circumference of the filtered section of each of the cigarettes.

Cigarettes are produced in large quantities and at high speed. Therefore, there has been developed and provided an apparatus for forming the micro-holes on the cigarettes while carrying them at high speed. In the case of this micro-hole forming apparatus, two micro-holes forming sections are provided and a laser beam aimed from a single laser source is split into two laser beams and these two laser beams are introduced into the two micro-hole forming sections. The cigarettes carried are also introduced to these two micro-holes forming sections where the laser beams are focused onto the cigarettes to form the micro-holes thereon The high speed production of cigarettes is thus performed.

In the case of the micro-hole forming apparatus provided with these two micro-hole forming sections, it is required that the micro-holes formed by each of the micro-hole forming sections are kept under a certain standard to keep the quality of the cigarettes high. In order to meet this standard, it is required that the laser beam aimed from the single laser source is split into the two laser beams which are substantially equal in light intensity, and a micro-hole forming apparatus which can meet this standard is realized.

Even if the laser beams split are equal in light intensity, it does not necessarily follow that those micro-holes which are under the certain standard can be formed on the cigarettes at the two micro-holes forming sections. It is therefor still possible that the micro-holes formed are different for every cigarette. This makes it desirable to examiner or check the micro-holes formed.

SUMMARY OF THE INVENTION

The object of the present invention is therefore to provide an apparatus capable of forming micro-holes which are produced under the certain standard on the cigarettes even when the cigarettes are carried at high speed.

Accordingly, to the present invention, there is provided an apparatus for forming micro-holes on cylindrical objects by a laser beam comprising means for dividing the laser beam into first and second laser beams; means for moving the dividing means to change the rate at which the laser beam is divided into the first and the second laser beam; first and second detecting means for detecting parts of the first and the second laser beam to generate first and second electric signals; first and second converging means for subdividing the first and the second laser beams to converge them onto corresponding rod-like matters; and mean for processing the first and the second signal detected generate a drive signal and driving the moving means responsive to this drive signal to move the dividing means to a position where the first and the second laser beam are divided at a substantially the same rate.

According to the present invention, there is further provided an apparatus for forming micro-holes on cylindrical objects by a laser beam comprising means for dividing the laser beam into first and second laser beams ; means for moving the dividing means to change the rate at which the laser beam is divided into the first and the second laser beam; first converging means for subdividing the first laser beam and converging them on the rod-like matters to form first micro-holes thereon; second converging means for subdividing the second laser beam and converging them on the rod-like matters to form second micro-holes thereon; means for applying pressure into each of the rod-like matters, on which the first or second micro-holes have been formed, through one end thereof; detecting means for detecting the pressure applied into the rod-like matter through one end thereof by the pressure means and detecting pressure run out of the rod-like matter through the other end thereof to generate third and fourth detection signals which represent the state of the first or second micro-holes on the rod-like matter; and means for processing the first and the second detection signal to generate a drive signal and driving the moving means responsive to the drive signal to move the dividing means to a position where the first and the second micro-holes formed are similar on the cylindrical objects.

According to the present invention, there is still further provided an apparatus for forming micro-holes on cylindrical objects by a laser beam comprising means for dividing the laser beam into first and second laser beams; a means for moving the dividing means to change the rate at which the laser beam is divided to first and second laser beams; first and second detecting means for detecting parts of the first and the second laser beam to generate first and second electric signals; first means for subdividing the first laser beam and converging them onto the rod-like matters to form first micro-holes thereon; second means for subdividing the second laser beam and converging them on the rod like matters to form second micro-holes thereon; means for applying pressure into the rod-like matter on which the first or second micro-holes have been formed through one end thereof; detecting means for detecting the pressure applied into the rod-like matter through one end thereof by the pressure applying means and detecting pressure run out of the rod-like matter through the other end thereof to generate third and fourth detection signals which represent the states of the first and the second micro-holes on the rod-like matters; and processing means for processing the first and the second detection signal to generate a first drive signal and processing the third and the fourth detection signals to generate a second drive signal, selecting one of the first and second drive signals and driving the moving means responsive to the selected one of drive signals to move the dividing means to a position where the laser beam is divided into the first and the second laser beam which have substantially same rate.

According to an apparatus of the present invention, light intensities of two-divided laser beams can be the same at all times so as to form micro-holes which are the same size on the cylindrical objects. In addition, dilutions which correspond to the micro-holes formed are detected and the light intensities of the two-divided laser beams can be adjusted by these dilutions thus detected. Therefore, the micro-holes formed on the cylindrical objects can be kept more equal in size. Further, the light intensities of the laser beams are detected to examine the state of the micro-holes formed on the cylindrical objects at the time when the apparatus starts its operation and the dilutions are directly detected to adjust these intensities during the operation of the apparatus. Therefore, the accuracy of the micro-holes formed can be kept higher from the time at which the apparatus starts its operation and during the normal operation of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention, and together with the general description given above and the detailed description of the preferred embodiment given below, serve to explain the principles of the invention.

DETAILED DESCRIPTION OF THE PREFERRED EMBODIMENT

An example of the micro-hole forming apparatus according to the present invention will be described with reference to the accompanying drawings.

Figure 1:
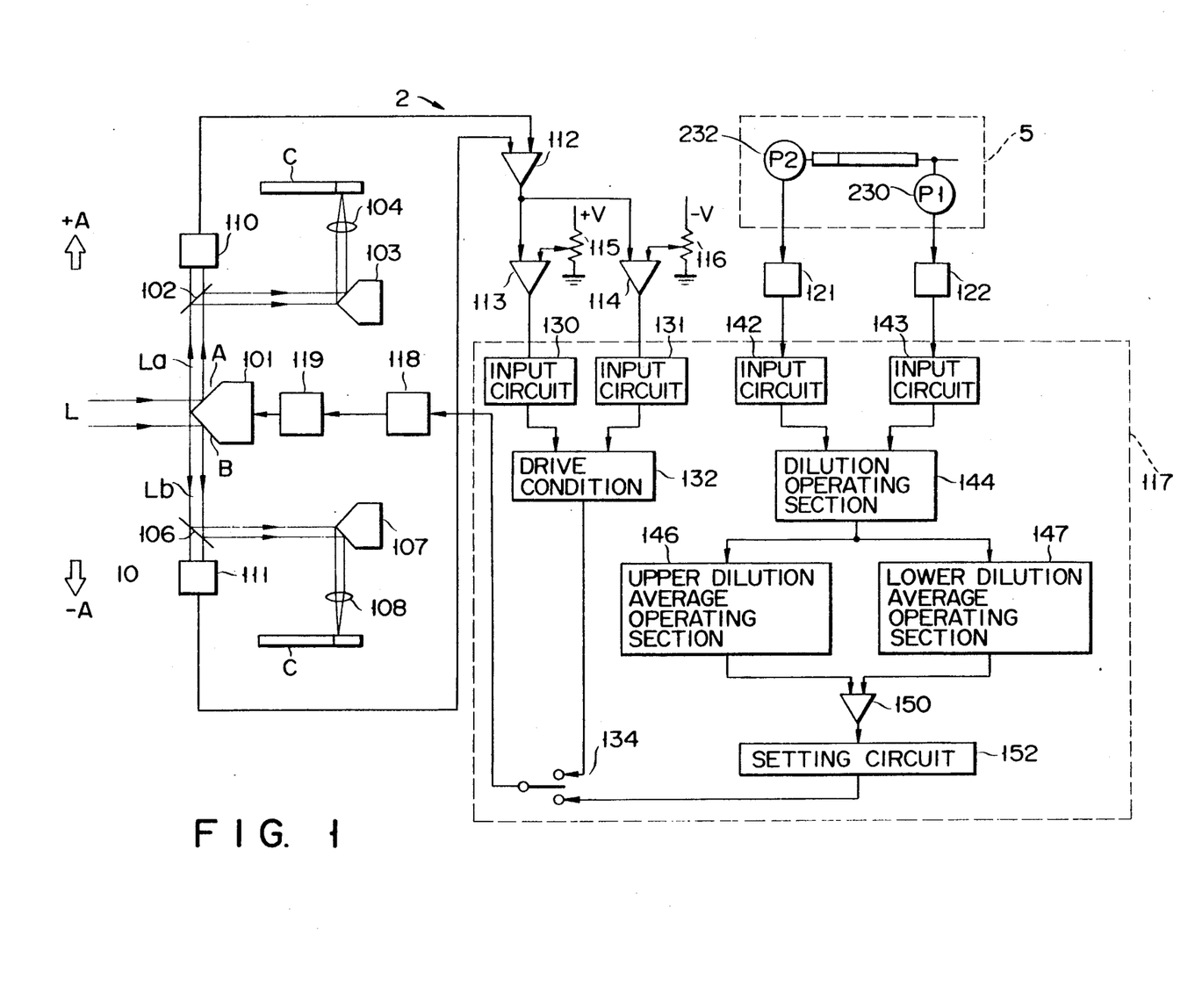
FIG. 1 is a block diagram generally showing a control system for controlling a micro-hole forming apparatus according to one embodiment of the invention.
Figure 2:
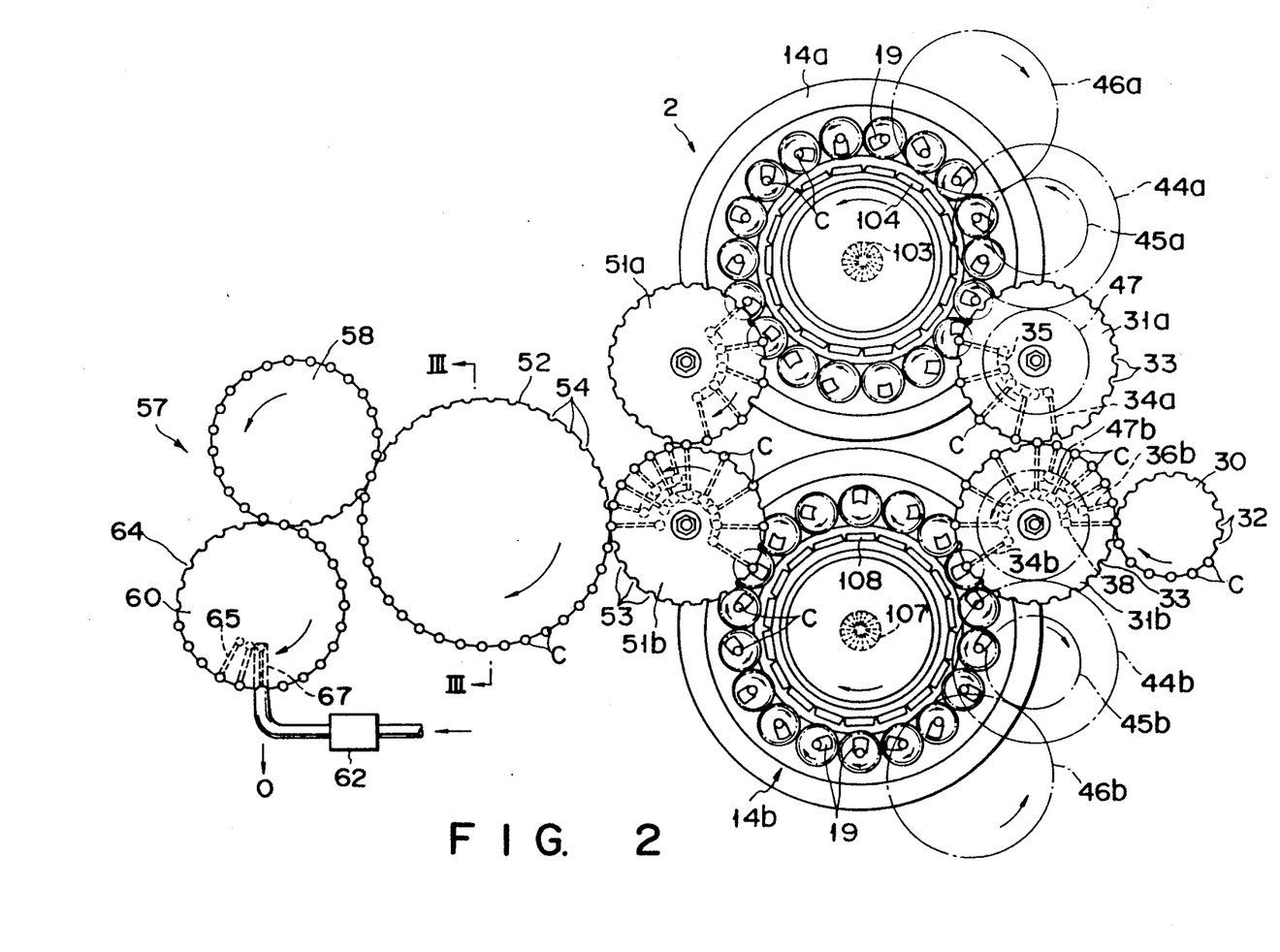
FIG. 2 is a plan generally showing the micro-hole forming apparatus controlled by the control system shown in FIG. 1.

FIG. 1 shows a control system for controlling a micro-hole forming apparatus according to the present invention and FIG. 2 shows the micro-hole forming apparatus controlled by the control system shown in FIG. 1.

As shown in FIG. 2, the micro-hole forming apparatus 2 includes micro-hole forming disks 14a and 14b, and substantially cone-shaped polyhedron mirrors 103 and 107 which rotate together with the disks 14a and 14b and are arranged on rotating shafts of the disks 14a and 14b, respectively. A plurality of focusing lenses 104 are located on a circle round the rotating shaft of the disk 14a and fixed there, opposing to reflecting faces of the polyhedron mirror 103, respectively. Pulse laser beam intermittently shot and introduced to the polyhedron mirror 103 through an optical system which will be described later in detail with reference to FIG. 1 is reflected and divided into a plurality of beams by the reflecting faces of the polyhedron mirror 103 and focused on outer circumferences of the cigarettes C, which are held on the outer circumference of the disk 14a, through the focusing lens 104 to form micro-holes thereon. Forming disk 14b operates in a similar manner.

A supply roller 30 and first and second intermediate supply rollers 31a and 31b which serve to carry the cigarettes C are located adjacent to the micro-hole forming disks 14a and 14b. The supply roller 30 is shaped like a column and provided with a plurality of holder grooves on the outer circumference thereof. Second intermediate supply roller 31b is closely arranged between the supply roller 30 and the second disk 14b. Similarly, the first intermediate supply roller 31a is closely arranged between the second intermediate supply roller 31b and the first disk 14a. The micro-hole forming disks 14a, 14b, intermediate supply rollers 31a, 31b and supply roller 30 are rotated at the same peripheral speed by a drive system (not shown).

A plurality of holder grooves 33 each having a semi-circular section are formed on the outer circumference of each of the intermediate supply rollers 31a, 31b and the interval between these holder grooves 33 on each of them and in the circumferential direction of each of them is the same as the interval between the holder grooves 32 on the supply roller 30 and half the interval between the holder arms 19 on each of the micro-hole forming disks 14a, 14b. A plurality of sucking holes (not shown) are formed in the bottom of each of the even numbered holder grooves 33 on the first intermediate supply roller 31a and these holder grooves 33 are connected via vacuum passages 34a to the sucking holes. These vacuum passages 34a are connected to a vacuum system (not shown) through an arc-shaped communicating groove 35. A plurality of sucking holes are similarly formed in the bottom of each of the uneven numbered holder grooves 33 on the second intermediate supply roller 31b and these holder grooves 33 are similarly connected via a vacuum passages 34 to the sucking holes. These vacuum passages 34b are connected via the vacuum system to an arc-shaped communicating groove 38. Further, sucking holes are also similarly formed in the bottom of each of the even numbered holder grooves 33 on the second intermediate roller 31b and these holder grooves 33 are connected via vacuum passages 36b to the sucking holes. These vacuum passages 36b are connected via the vacuum system to an arc-shaped communicating groove 39 which is different from the communicating groove 38. The communicating groove 35 in the first intermediate roller 31a extends from a position where the first intermediate roller 31a is close to the second intermediate one 31b to a position where the roller 31a is close to one of the holder arms 19 on the first disk 14a. The communicating groove 38 in the second intermediate roller 31b extends from a position where roller 31b is close to the supply roller 30 to a position where the roller 31b is close to one of the holder arms 19 on the second disk 14b. The communicating groove 39 in the second intermediate supply roller 31b extends from a position where roller 31b is close to the supply roller 30 to a position where the roller 31b is close to the first intermediate supply roller 31a.

The micro-hole forming apparatus has the above-described arrangement. Therefore, fed from the previous process in the course of manufacturing the cigarettes C are received, held and carried in the holder grooves 32 on the roller 30 as the roller 30 rotates. When the cigarettes C carried by the supply roller 30 come near the second intermediate supply roller 31b, they are transformed into the holder grooves 33 on the second intermediate supply roller 31b. Therefore, the cigarettes successively carried by the supply roller 30 are sucked, held and carried in the holder grooves 33 on the second intermediate supply roller 31b as it rotates. The communicating groove 39 is connected to the even numbered holder grooves 33 and extends to the second intermediate supply roller 31b only from the position where this roller 31b contacts the supply roller 30 to the position where it contacts the first intermediate supply roller 31b. When the even numbered holder grooves 33 on it are moved to the position where it contacts the first intermediate supply roller 31a, therefore, the cigarettes held in the even numbered holder grooves on the second intermediate supply roller 31b are released from there one by one and transferred into the even numbered holder grooves 33 on the first intermediate supply roller 31a. The cigarettes C thus transferred to the first intermediate supply roller 31a are held and carried in the even numbered holder grooves 33 on the roller 31a. When the cigarettes C are moved to the position where the first intermediate supply roller 31a contacts one of the holder arms 19 on the first disk 14a, they are successively transferred one by one to the holder arms 19 on the first disk 14a. On the other hand, the cigarettes C held in the uneven numbered holder grooves 33 on the second intermediate supply roller 31b are carried, passing over the position where the first and second intermediate supply rollers 31a and 31b are close to each other. The cigarettes C in the uneven numbered holder grooves 33 on the roller 31b are moved to a position where the roller 31b is close to one of the holder arms 19 holder arms 19 on the second disk 14b. The cigarettes C supplied from the supply roller 30 are grouped, as described above, into even and uneven numbered ones by the intermediate supply rollers 31a and 31b and the ones of the even numbered group are transferred to the holder arms 19 on the first disk 14a while the others of the uneven numbered group are transferred to the holder arms 19 on the second disk 14b.

The holder arms 19 on the first and second micro-hole forming disks 14a and 14b are rotated, associating with rotation first and second disks, by a drive system (not shown). Therefore, the holder arms 19 are rotated around the rotating shaft of each of the disks 14a and 14b while rotating round their own centers. The micro-holes are thus formed on an outer circumferences of the cigarettes C by pulse laser beams which are reflected by the polyhedron mirrors 103 and 104 and focused on the cigarettes C through the focusing lenses 104 and 108.

Figure 3:
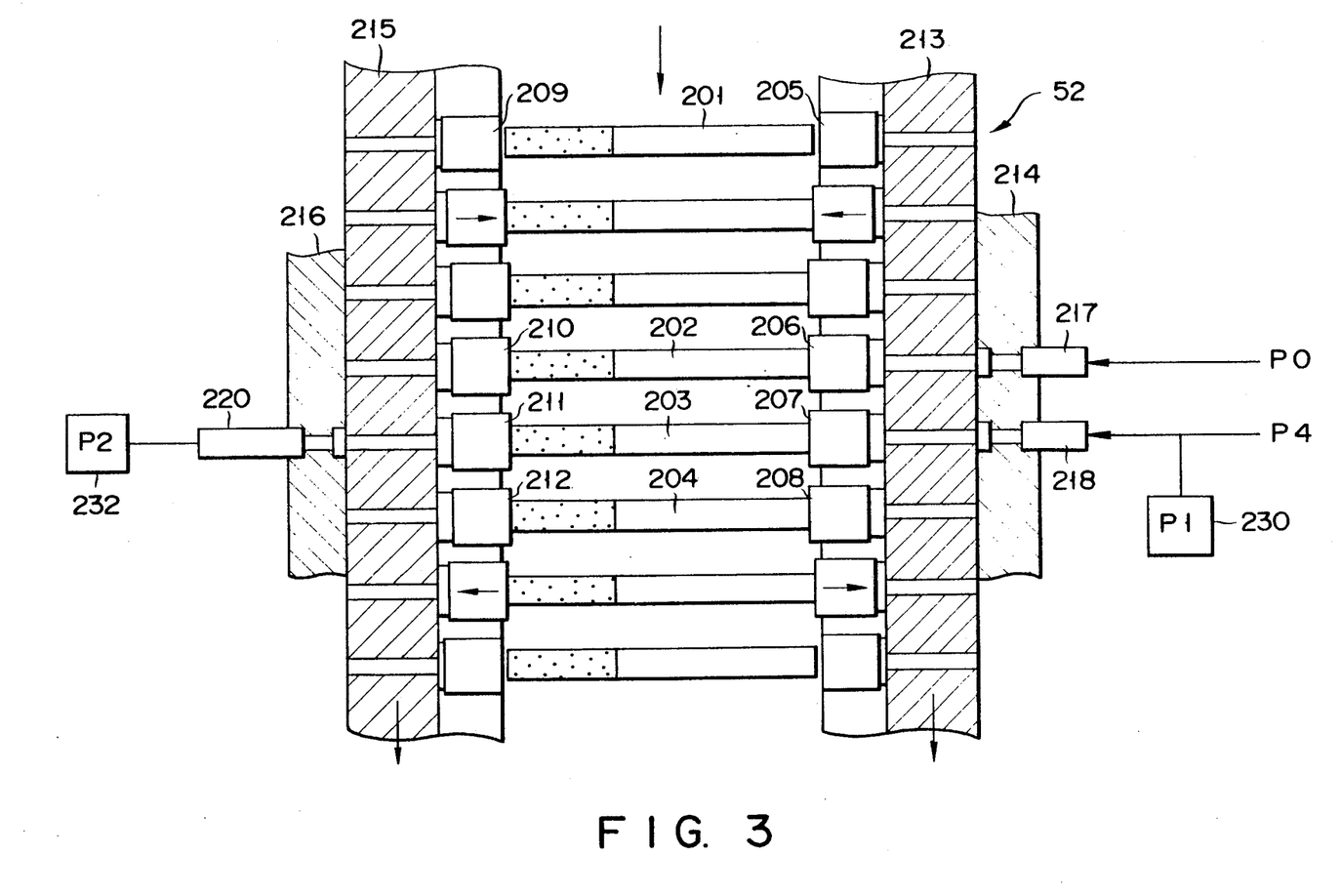
FIG. 3 is a sectional view generally showing a detector apparatus for the micro-hole forming apparatus shown in FIG. 2, said detector apparatus serving to detect the state of the micro-holes formed on cigarettes.

First and second intermediate discharge rollers 51a and 51b are located on the discharge side of the micro-hole forming apparatus and they are symmetrical to the first and second intermediate supply rollers 31a and 31b with the first and second disks 14a and 14b interposed between them. They have holder grooves 53, communicating grooves and vacuum passages, which are same in arrangement as those of the rollers 31a and 31b. Therefore, description of the rollers 51a and 51b will be omitted, but the rollers 51a and 51b are different from the rollers 31a and 31b in that the rollers 51a and 51b are rotated in a direction reverse to the direction in which the rollers 31a and 31b are rotated. A dilution detecting apparatus which will b described later is located contacting the second intermediate discharge roller 51b. Namely, a dilution drum 52 which has such a structure as shown in FIG. 3 is located on the discharge side of the first and second intermediate discharge rollers 51a and 51b. This dilution drum 52 and the second intermediate discharge roller 51b are similarly provided with holder grooves 53 and 54 on their outer circumferences and these holder grooves 53 and 54 each having a semi-circular section are arranged at a same interval. Therefore, the uneven numbered cigarettes C are transferred from the first disk 14a to the first discharge roller 51a while the even numbered ones from the second disk 14b to the second discharge roller 51b. Therefore, all of the cigarettes C held on the discharge roller 51b are transferred one by one to the holder grooves 54 on the dilution drum 52. Further, an eliminator system 57 for eliminating defective cigarettes is located near the dilution drum 52. The eliminator system 57 comprises an eliminating drum and a carriage roller which is contacted with the eliminating and dilution drums.

The micro-hole formed cigarettes C are sent one by one from the holder arms 19 on the first and second disks 14a and 14b to the dilution drum 52 through the amount of air introduced into each of the cigarettes is measured, as will be described later, on the outer circumference of the dilution drum 52. Those cigarettes whose measurements has been finished are carried to an eliminator drum 60 through the carriage roller 58 which is similar in arrangement to the supply roller 30. As seen in the case of the intermediate supply rollers 31a, 31b and intermediate discharge rollers 51a, 51b, the eliminator drum 60 has sucking passages 65 connected to a sucking pump (not shown) and sucking holes (not shown) connected to the sucking passages, and the cigarettes C are therefore sucked and carried in holder groove 64 on the outer circumference of the eliminator drum 60. When one of the cigarettes C is defective, that is, when its paper roll is defective or its dilution value is extremely large, a valve system 62 interposed between the sucking pump and the sucking passage 65 is made operative. When this valve system 62 is made operative, compression air is fed from an air supply pump (not shown) into the sucking passage 65 through a blow pipe 67 which extend to the sucking passage 65. The pressure of the air fed into the blow pipe 67 is larger than sucking force added to the cigarette C sucked and held by the sucking pump through the sucking passage 65. As the result, the defective cigarette C is released by the holder groove 64 and eliminated from the eliminator drum 60.

The micro-hole formed cigarettes C transferred to the dilution drum 52 are located between pads 205 and 209 and sucked and held in the holder grooves 54 on the drum 52 by a sucking system (not shown), as shown in FIG. 3. The cigarettes c are then sandwiched between the pads 205 and 209 which are advanced by a cam system (not shown) as the dilution drum 52 rotates. When each of the cigarettes C which are held under this state comes to a position 202, pre-pressure P0 is added to them through a pre-pressure pipe 217, a control ring 214, a testing ring 213 and a pad 206. Its filtered end is closed this time by a control ring 216 and internal pressure in it is thus increased. When this cigarette into which the pre-pressure PO has been added comes to a position 203, compressed air P4 is added, as detecting pressure, to it through a pad 207. Pressure in it reaches a pressure transducer 232 through a pad 211 and a pipe 220 and this pressure is detected as reduced pressure value P2 because air in it flows out of it through the micro-holes on its outer circumference and through its paper roll. The detecting pressure P4 and the reduced pressure value P2 are converted to electric signals by pressure transducers 230 and 232 and the dilution of the cigarette is obtained from the operational calculation carried out on the basis of these electric signals, as will be described later. This enables the apparatus to confirm whether or not the micro-holes formed on the filtered section of the cigarette C are within a standard. After this measurement is finished, the cigarette C is carried by the dilution drum 52 as it rotates, and it is again sucked and held in the holder groove 54 on the dilution drum 52 by the sucking system a the pads 205 and 209 are retreated by the action of the cam. Thereafter, the cigarette is released from the holder groove 54 and transferred to the above-described eliminator system 57.

A laser optical system and a control system for the micro-holes forming apparatus will be now described with reference to FIG. 1.

Laser beam L intermittently emitted from a laser generating source or carbon dioxide gas laser (not shown) and having a circular cross-section is divided into first and second semicircular laser beams La and Lb and reflected in two directions +A and −A by a two-dividing mirror 101 which has reflecting faces A and B, as shown in FIG. 1. The first laser beam La reflected in the direction +A is further divided into two laser beams by a half mirror 102. The laser beam passed through the half mirror 102 and having a light intensity equal to about 5% of the light intensity of the laser beam La is detected by a photodetector 110 and converted to electric signal. The portion at the laser beam reflected by the half mirror 102 is directed to the polyhedron mirror 103. The laser beams are further subdivided and reflected radially on the disk 14a by the reflecting faces of the polyhedron mirror 103. Each of the subdivided laser beams is converged by the focusing lens 104 to form a spot of small diameter on the outer circumference of the filtered section of the cigarette C. A micro-hole is thus formed on the cigarette C. Each of the laser beams La is semicircular in cross-section, as described above. Therefore, the laser beams are made incident upon the polyhedron mirror 103 at the half upper area of the mirror 103 and they are aimed at an area where the cigarettes C are held in FIG. 1 or only to the upper half of the first disk 14a in FIG. 1.

The laser beams Lb reflected in the direction −A are also divided by a half mirror 106 and one of the laser beams thus divided is detected by a photo-detector 111 while the other thereof is further sub-divided by the polyhedron mirror 107. Each of the laser beams thus subdivided is aimed at the cigarette C through the focusing lens 108 to form the micro-holes on the outer circumference of the filtered section of the cigarette C.

The control system shown in FIG. 1 is provided with a drive system 119 for precisely moving the two-dividing mirror 101 in the direction +A or −A to divide the laser beam L into the two laser beams La and Lb which have a same light intensity. The drive system 119 is made operative in response to the difference between electric signals applied from the photodetectors 110 and 111 and the light intensities of the laser beams La and Lb divided by the two-dividing mirror 101 can be thus kept equal to each other to allow the micro-holes to be formed on the outer circumference of the filtered section of the cigarette C within a certain standard. Namely, the electric signals detected by the photodetectors 110 and 111 are applied to a differential amplifier 112, from a differential output of a minus or plus level, which corresponds to the difference of one electric signal relative to the other electric signal is generated. When the light intensity of the laser beam La is smaller than that of the laser beam Lb, which depends upon the direction in which the two-dividing mirror 101 is to be moved, the differential output of plus level is generated by the differential amplifier 112 and when the light intensity of the laser beam La is larger than that of the laser beam Lb, the differential output of minus level is generated by the differential amplifier 112. The differential output is applied to first and second differential amplifiers 113 and 114. In order to determine the upper plus and minus limits of the light intensity difference between the laser beams La and Lb the first and second differential amplifiers 113 and 114 are connected to current generators +V and −V through variable resistances 115 and 116 to receive certain reference voltage from the current generators. When the differential output applied from the differential amplifier 112 does not exceed the upper plus or minus limit, neither of the differential amplifiers 113 nor 114 generates any differential output because the light intensity difference between the laser beams La and Lb is an allowable value. When the differential output of plus level which exceeds the upper plus limit is applied to the first and second differential amplifiers 113 and 114, however, and output signal which commands the two-dividing mirror 101 to be moved to the plus side is generated by the first differential amplifier 113 and when the differential an output of minus level which exceeds the upper minus limit is applied to the first and second differential amplifiers, output signal which commands the mirror 11 to be moved to the minus side is generated.

The output signals applied from the differential amplifiers 113 and 114 are inputted to a control unit which comprises a micro-computer and peripheral circuits. This control circuit 117 comprises input circuits 130 and 131 which serve as interfaces, and a circuit 132 for determining drive conditions for the mirror 101. When the output signal which commands the mirror 101 to be moved to the plus side is applied from the first deferential amplifier 113 to the input circuit 130, the output signal it is converted to a digital signal and applied to the determining circuit 132. An operation performed by the circuit 132 and the command which to moves the mirror 101 to the plus side or rotate the motor forward is generated by the determining circuit 132. When the output signal which commands the mirror 101 to the minus side is applied from the second differential amplifier 114 to the input circuit 131, this output signal is converted to digital signal by the input circuit 131 and applied to the determining circuit 132. Another operation is similarly carried out in the circuit 132 and a command which moves the mirror 101 to the minus side or rotate the motor backward is generated by the determining circuit 132. Another operation is similarly carried out in the circuit 132 and the command which asks to move the mirror 101 to the minus side or rotate the motor backward is generated by the circuit 132. When this command is applied to a two-dividing mirror driving circuit 118 through a switching circuit 134, drive current or forward or backward drive current is generated responsive to the command and a two-dividing mirror driving means 119 or a unit for converting the rotation force of the motor to linear movement is made operative. When the drive means 119 is made operative, the two-dividing mirror 101 is moved in the direction commanded until the light intensities of the laser beams La and Lb become equal to each other. When they become equal to each other, no output is generated by the differential amplifiers 113 and 114, as already described above. Therefore, a command which stops the mirror 101 at the position is generated by the determining circuit 132. The movement of the two-dividing mirror 101 is thus stopped.

Figure 4A:
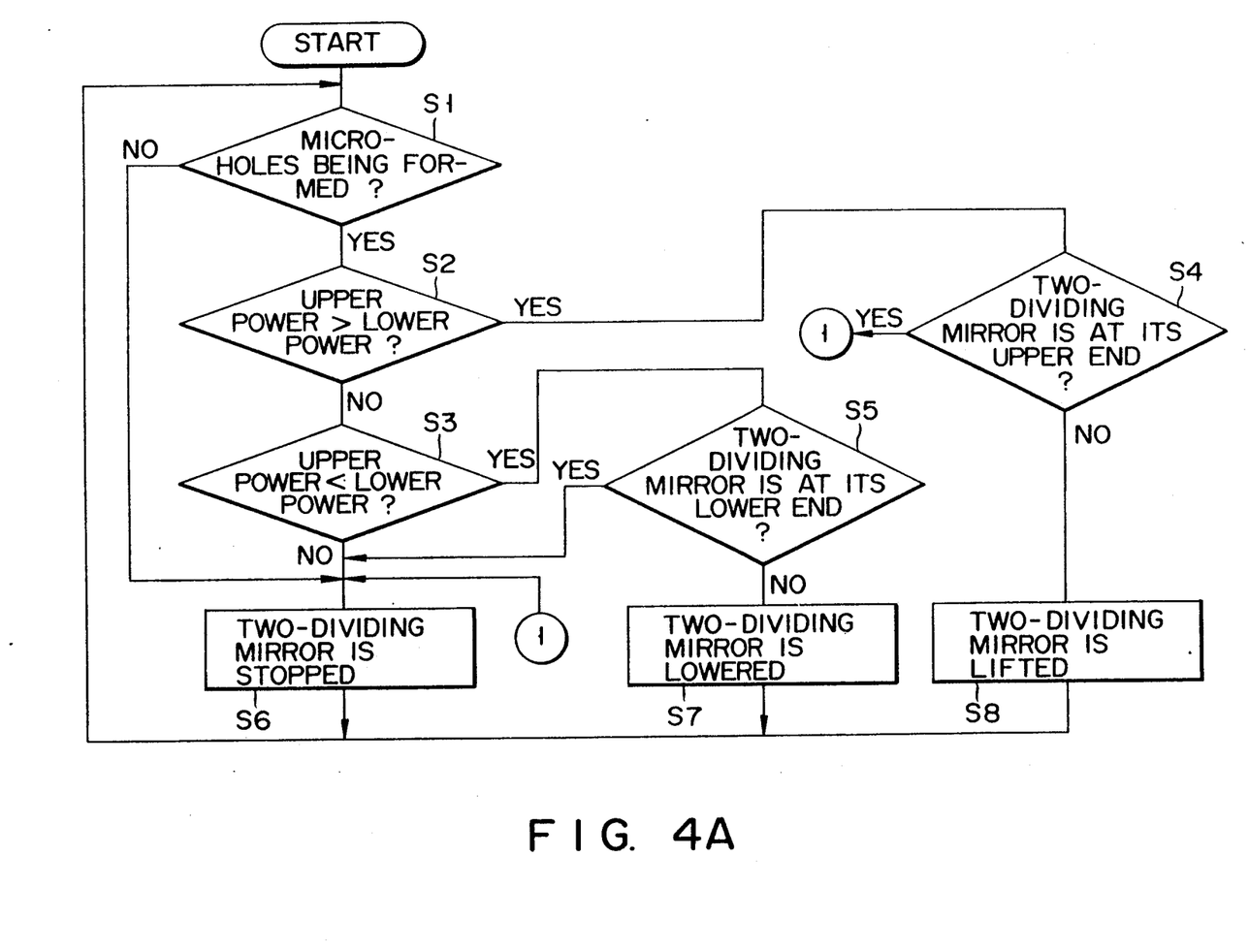
FIGS. 4A and 4B are flow charts intended to show the operation of the control system shown in FIG. 1.

The control operation of the control system shown in FIG. 1 will be described in more detail referring to flow a chart in FIG. 4A. During the operation of the micro-hole forming apparatus, step S1 determines whether or not the apparatus is forming the micro-holes on the outer circumference of the filtered section of the cigarette. When the micro-holes are being formed on the cigarette and the answer at step S1 is yes, step S2 determines whether the power of the laser beam aimed at the reflecting faces A and B of the two-dividing mirror 101 or the upper +A side power is larger than the lower −A side power. When the answer is yes, step S4 determines whether or not the two-dividing mirror 101 reaches its upper end. When the answer is no, the two-dividing mirror 101 is raised at step S8. Namely, the process is returned to the start and it is checked whether or not the laser beam L is equally divided at the present position of the two-dividing mirror 101. The process again follows the above-described flow. When the answer is no at step S3, it is checked whether or not the upper +A side power is smaller than the lower −A side power. When the answer is yes, step S5 determines whether or not the two-dividing mirror 101 reaches its lower end. When the answer is no, the two-dividing mirror 101 is lowered. The process is returned to the start to again check the present position of the mirror 101 and process follows the above-described flow. When the answer is yes at step S4, the two-dividing mirror 101 is stopped at step S6 to protect the system. The process is returned to the start and it again follows the above-described flow. When the answer is no at step S1, the two-dividing mirror 101 is stopped at the step S6. The process is returned to the start to again check the present a position of the mirror 101. As described above, the position of the two-dividing mirror 101 is adjusted at all times by the control circuit 117 shown in FIG. 1 in such a way that the light intensities detected by photodetectors 110 and become substantially equal to each other. The laser power can be adjusted by the movement of the two-dividing mirror 101 alone and this enables the control system for the micro-hole forming apparatus to be simpler in construction.

Even if the divided laser beams whose light intensities are substantially equal to each other are focused onto the cigarettes, it does not necessarily follow that the micro-holes which are being formed are within the certain standard and it is feared that the defective pasting of the paper roll of the cigarettes cannot be discovered. In the case of the micro-hole forming apparatus according to the present invention, the dilution drum 52 is provided with a dilution detector apparatus 5.

Figure 5:
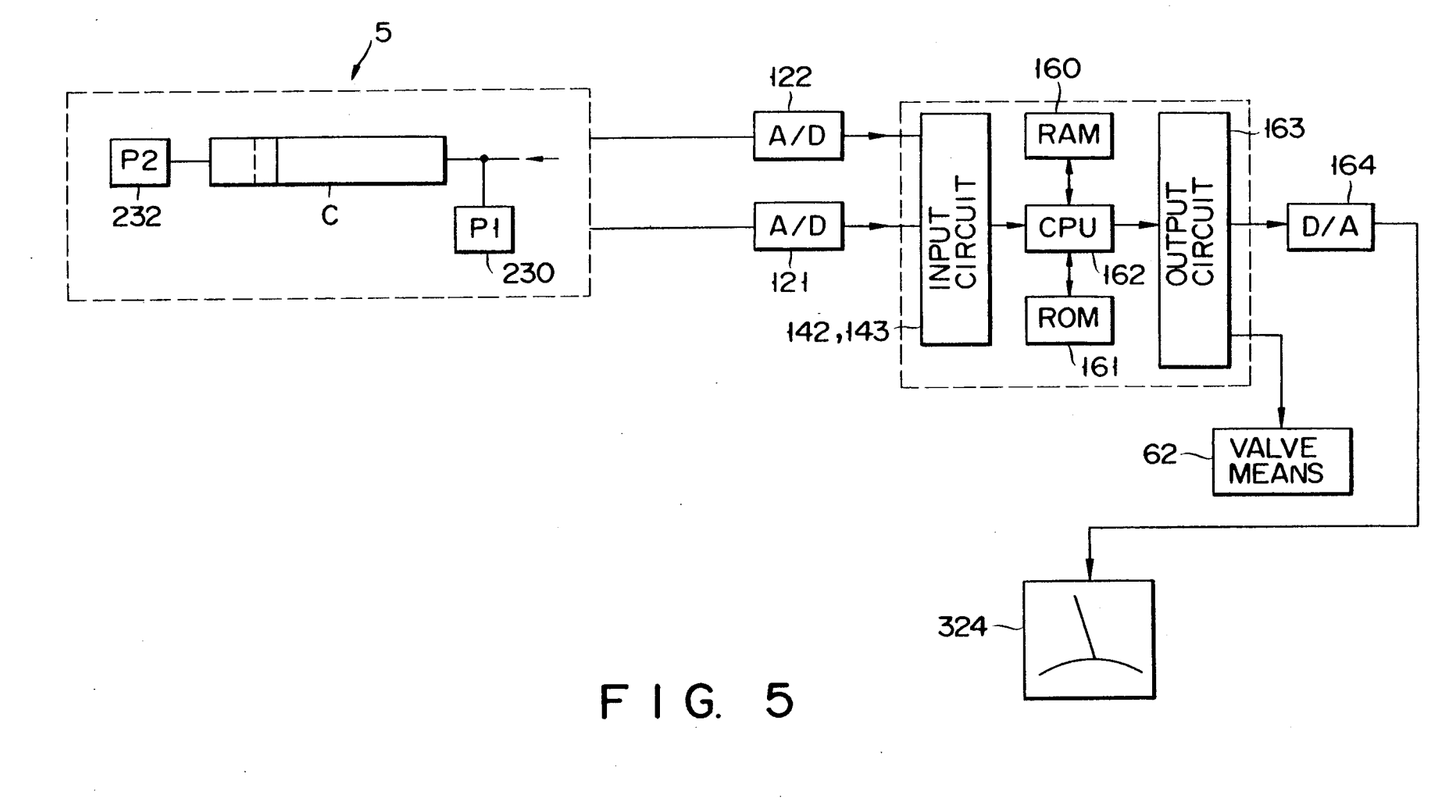
FIG. 5 is a block diagram showing the dilution detecting control system shown in FIG. 1.

According to the dilution detecting apparatus 5, the compressed air P1 applied to the cigarette C from the tobacco side thereof and the pressure P2 of air exiting cigarette C through the filtered side thereof are converted into electric signals by the pressure transducers 230 and 232 and these electric signals are converted to digital signals by A/D converters 121 and 122 and inputted to a dilution operating section 144 through input circuits 142 and 143 of the control circuit, as shown in FIG. 1. The dilution operating section 144 comprises a CPU 162, a RAM 160 and a ROM 161, as shown in FIG. 5. The dilution of every cigarette is arithmetically calculated in the CPU 162, using an operational formula stored in the ROM 161, and operational results thus obtained are successively inputted to the RAM 160. After a certain number of data are collected, the average value of dilutions relating to the cigarettes C on which the micro-holes have been formed by the upper micro-holes forming disk 14a is arithmetically calculated, as an upper dilution average value, by an upper dilution average value operating section 146. Similarly, the dilution of every cigarette C is arithmetically calculated in the CPU 162, using the operational formula stored in the ROM 161 and operational results thus obtained are inputted to the RAM 160. The average of dilutions relating to the cigarettes C on which the micro-holes have been formed by the lower micro-holes forming disk 14b is arithmetically calculated, as a lower dilution average value, by a lower dilution average value operating section 147. After each of the upper and lower dilution average values is stored in the RAM 160, both of them are compared with each other by a comparator section 150 or CPU 162. The comparison result thus obtained is converted to analog signal by a D/A converted 164 through an output section 163 and this analog signal is applied to a display section 324 where the average value is displayed. When information relating to such a dilution that is different from the average value and that shows that the cigarette is defective is inputted to the CPU 162, a command relating to the defective cigarette is applied from the CPU 162 to the output section 163 and the valve means 62 of the eliminator system 57 is made operative by the command to eliminate the cigarette from the eliminating drum 60.

The comparison result is applied to a drive condition setting section 152 or compared with data in the ROM 161 to determine the drive condition of the two-dividing mirror 101. When the upper dilution average value is equal to the lower dilution average value, the command which asks to stop the two-dividing mirror 101 where it now is, is generated by the drive condition setting section 152 or CPU 162. When the upper dilution average value is smaller than the lower dilution average value, the command which asks to stop the two-dividing mirror 101 where it now is generated by the drive condition setting section 152 or CPU 162. When the upper dilution average value is smaller than the lower dilution average value, the command which asks to move the mirror 101 to the direction −A is generated by the setting section 152 or CPU 162. When the upper dilution average value is larger than the lower dilution average value, the command which asks to move the mirror 101 to the direction +A is generated.

As already described, the two-dividing mirror 101 is moved by the drive means 119, responsive to the commands applied from the drive condition setting section 152. When the micro-hole forming apparatus starts its operation, the switching circuit 134 is connected to the first drive condition setting section 132 and the two-dividing mirror 101 is controlled by the control circuit 11 to keep the light intensities of the divided laser beams substantially equal. After the dilutions are measured relating to a certain number of the cigarettes, the switching circuit 134 is connected to the second drive condition setting section 152 and the two-dividing mirror 101 is controlled by the control circuit 117 to form uniform micro-holes on the cigarettes on the upper and lower micro-holes forming disks 14a and 14b.

Figure 4B:
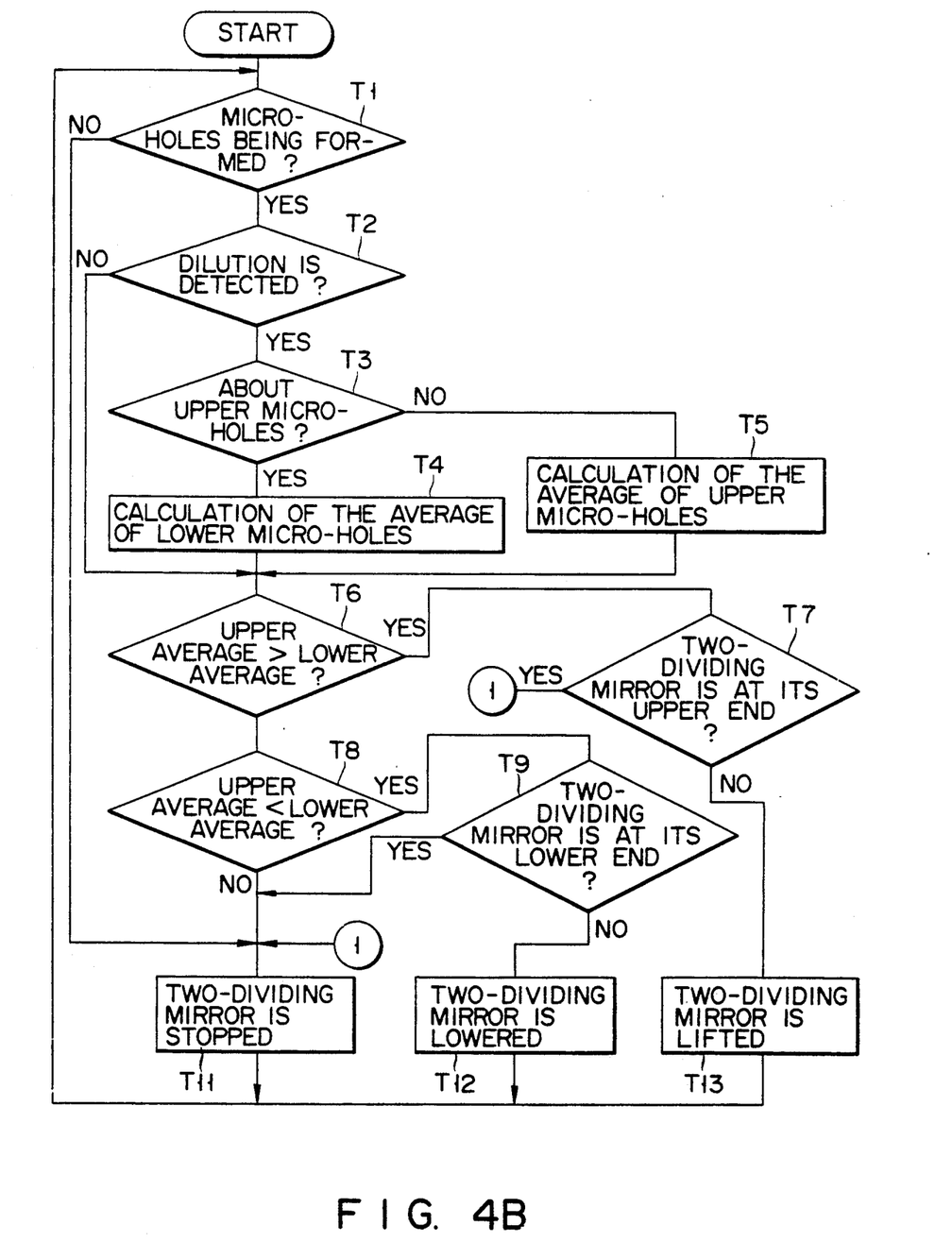

The control circuit 117 will be described in still further detail with reference to a flow chart shown in FIG. 4B. Step T1 determines whether or not the micro-holes are being formed on the outer circumferences of the cigarettes. When the answer is yes, step T2 determines whether or not the dilution is detected relating to every cigarette. When the answer is yes, step T3 determines whether or not the dilution detection has been carried out relating to the micro-holes which have been formed on the cigarettes by the upper micro-holes forming disk 14a or +A side laser beams. When the answer is yes, the average value of dilution values detected about the micro-holes which have been formed on the cigarettes by the upper disk 14a is arithmetically calculated at step T4, but when the answer is no, the average value of dilution values detected about the micro-holes which have been formed on the cigarettes by the lower micro-holes forming disk 14b is arithmetically calculated at step T5.

The above-mentioned arithmetical calculation is intended to calculate the average value of dilution values detected about those cigarettes (36 of cigarettes) which are carried by the dilution drum 52 when it is rotated one time, and to calculate the running average relating the above average values about those cigarettes (1152 cigarettes) which are carried by the dilution drum when it is rotated 32 times. This running average is displayed by the dilution display meter 324 (the running average obtained for about 17 seconds in the case of 4000 rotations of the drum). The average value is renewed every rotation of the drum 52. When no paper roll is pasted around a cigarette or the pasting of the paper roll around the cigarette is abnormal, the arithmetical calculation is carried out not about the abnormal cigarette, but about a next normal cigarette.

The average values calculated at steps T4 and T5 are compared with each other at step T6 and when the upper average larger than the lower average, step T7 determines whether or not the two-dividing mirror 101 reached its upper end. When the answer is no, the mirror 101 is raised at step T12 and the process is returned to the start to check whether or not the laser beam L is equally divided into two by the mirror 101 which is at the present invention, and the process then follows the above-described flow again. When the answer is yes at step T7, the two-dividing mirror 101 is stopped to protect the system and the process is returned to the start. When the answer is no at step T6, step T8 determines whether or not the upper average is smaller than the lower average. When the answer is yes, step T9 determines whether or not the two-dividing mirror 101 reaches its lower end. When the answer is no, the mirror 101 is lowered at step T11 and the process is returned to the start to control the present position of the two-dividing mirror 101. When the answer is yes at step T9, the two-dividing mirror 101 is stopped at step T1 to protect the system and the process is returned to the start. When the answer is no at step T8, the command to stop the mirror 101 is generated because the two-dividing mirror 101 is at that position where the laser beam L is equally divided into two.

Therefore, the position of the two-dividing mirror 101 can be adjusted while detecting every cigarette whether or not its micro-holes formed are under the standard and also checking the quality of the cigarettes themselves. This enables the dilution values of those cigarettes which are processed on both of the +A and −A sides to be equal to each other.

The above-cited dilution average value represents the running average calculated except the following cases:

1) A case where the dilution value detected exceeds the upper limit level which is regarded as abnormal;

2) a case where the dilution value detected is smaller than the lower limit level which is regarded as abnormal;

3) a case where the measuring pressure or detecting value P1 is smaller than the lower limit level (the cigarette has no paper roll or its paper roll is broken in this case); and 4) a case where the pressure P2 of air run out of the cigarette through the filtered end thereof is smaller than the lower limit level (the cigarette has no paper roll or its paper roll is broken in this case).

Any cigarettes which belong to the above cases 1)–4) are regarded as abnormal and eliminated one by one by the eliminator system 57, as already described above.

Figure 6A:
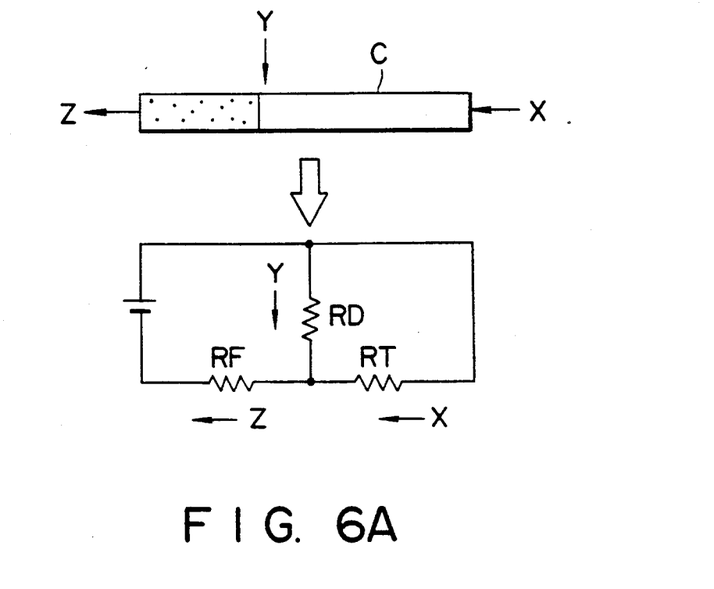
FIGS. 6A and 6B show equivalent circuits for pressures used and detected in the course of detecting dilution, said circuits being intended to explain a method of detecting dilution.

The operational formula for obtaining the dilution (D) will be described with reference to FIGS. 6A and 6B. When ventilating resistance added to the cigarette is replaced by an electric equivalent circuit, the dilution (D) can be as follows:

$$D = Y/Z = (Z-X)/Z$$

wherein X represents the amount of air sucked into the cigarette through the tobacco end thereof, Y the amount of air sucked into the cigarette through the outer circumference thereof and Z the sum of X and Y or the amount of air sucked into the mouth of the smoker.

Therefore, $$D = RT/(RD + RT)$$

Figure 6B:
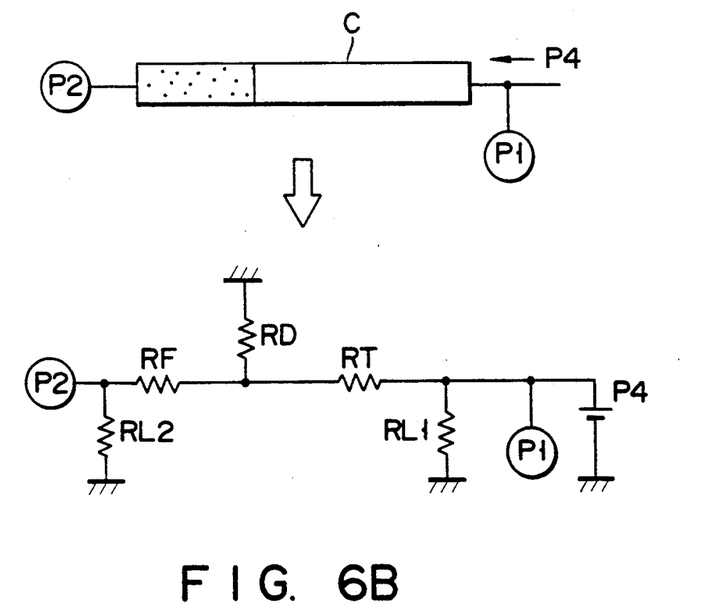

It is assumed that two pressure sensors connected as shown in FIG. 6B are used. It is further assumed that equivalent resistance on the upstream side is denoted by RT and equivalent resistance on the down-stream side by RF when viewed from the direction in which the compressed air flows into the cigarette. It is still further assumed that the equivalent resistance of air passing though the micro-holes on the outer circumference of the filtered section of the cigarette is denoted by RD, pressures of air leaked through the pads which hold the cigarette from both ends thereof by RL1 and RL2, the pressure of air blown into the cigarette by P4, the pressure of air detected before the air is introduced into the cigarette by P1, and the pressure of air detected after the air passed through the cigarette by P2. With these assumptions, $$P2 = \frac{RD/RL2}{RD(RF + RL2) + RT(RD + RF + RL2)} P4$$

When RL2=RF and RL2=RD, the above equation becomes $RD \times P4 / (RD+RT)$.

When (P1−P2) / P1 is calculated, (P1=P4).

Therefore, the dilution (D) becomes as follows:

$$\begin{aligned} D &= P4 - RD \times P4/(RD + RT)/P4 \\ &= 1 - RD/(RD + RT) \\ &= RT/(RD + RT) \end{aligned}$$

As described above, the first drive condition setting section 132 serves to determine the initial state of the micro-hole forming apparatus while the second drive condition setting section 152 serves to determine the operating state of the apparatus when the apparatus is being normally operated. The accuracy of the micro-holes formed by the apparatus can be kept certain or higher even at the time when the apparatus is started and during the time when it is being normally operated.

According to the above-described apparatus, pressure is introduced two times into the cigarette as the pre-pressure PO and the detecting pressure Pl. This enables the pressure to reach the filtered side end of the cigarette. Even when the dilution drum 52 is rotated at high speed, therefore, the pressures detected are same as those detected when the drum 52 is rotated at low speed. This enables detection accuracy to be made higher even when the cigarettes C are carried at high speed.

In the case of the micro-hole forming apparatus provided with the amplifier system and the dilution detecting system as described above, the switching means 134 enables the position of the two-dividing mirror 101 to be controlled by the other of lines of setting the driving condition for the mirror 101 even when one of these lines is broken.

It should be understood that the micro-hole forming apparatus 2 according to the present invention is not limited to the above-described embodiment and that various changes and modification can be made depending upon the intention of the user. Each of those matters through which the micro-holes are to be formed by the apparatus may be shaped like a circle, for example.

As described above, the micro-hole forming apparatus according to the present invention is provided with the system for detecting the laser beam and the system for detecting dilutions. Therefore, light intensities of the two-divided laser beams can be kept equal to each other. Further, the state of the micro-holes can be checked every cigarette, so that the micro-holes formed cigarettes can be produced with higher quality.

Additional advantages and modification will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An apparatus for forming micro-holes on cylindrical objects comprising:

means for generating an input laser beam;

means for dividing the input laser beam into first and second laser beams;

means for moving the dividing means to change the ratio at which the laser beam is divided into the first and the second laser beams;

first and second detector means for detecting portions of the first and the second laser beams, respectively to generate first and second electric signals;

first and second converging means for subdividing the remaining portions of the first and the second laser beams and for converging the subdivided first and second beams onto corresponding cylindrical objects;

first and secnd means for rotating the cylindrical objects around axes thereof, while holding the cylindrical objects to enable micro-holes to be formed on the outer circumference of the rotating cylindrical objects by the first and second laser beams; and processing means for processing the first and the second signals to generate a drive signal and driving the moving means responsive to the drive signal to move the dividing means to a position where the first and the second laser beams are of substantial equal intensity.

2. The apparatus of claim 1, wherein each of the cylindrical objects is a cigarette, around which a paper roll is pasted and to which a filter is attached, and the micro-holes are formed on the outer circumference of the filter of the cigarette.

3. The apparatus of claim 1, wherein the dividing means includes first and second reflecting faces by which the first and second laser beam are reflected.

4. The apparatus of claim 1, further comprising:

first means for directing the portion of the first laser beam sent from the dividing means to the first detector means and directing the remaining portion of the first laser beams to the first converging means; and second means or directing the portion of the first laser beam sent from the dividing means to the second detector means and directing the remaining portion of the second laser beam to the second converging means.

5. The apparatus of claim 1, wherein the first converging means includes a first rotary body having a first plurality of reflecting faces, for subdividing the remaining portion of the first laser beam and lenses for converging the subdivided first laser beam onto the cylindrical objects and the second converging means includes a second rotary body having a second plurality of reflecting faces for subdividing the second laser beam and lenses for focusing the subdivided second laser beam onto the cylindrical objects.

6. The apparatus of claim 1, wherein the processing means includes means for comparing the first electric signal detected with the second electrical signal detected and for keeping levels of both electric signals substantially equal.

7. The apparatus of claim 1, wherein the moving means moves the dividing means in a range defined by first and second positions.

8. The apparatus of claim 7 wherein the processing means deenergizes the moving means to stop the dividing means when the dividing means reaches a first or second position and the processing means energizes the moving means to move the dividing means from one of the first and second positions.

9. The apparatus of claim 1, wherein said first and second means for rotating include,
   a first mechanism for rotating the first rotating means around a center axis of said first means for rotating; and
   a second mechanism for rotating the second rotating means around a center axis of said second means for rotating.

10. An apparatus for forming micro-holes on cylindrical objects comprising:
   means for generating an input laser beam;
   means for dividing the input laser beam into first and second laser beams;
   means for moving the dividing means to change the ratio at which the laser beam is divided into the first and the second laser beams;
   first converging means for subdividing the first laser beam and focusing the subdivided first laser beam on the cylindrical objects to form first micro-holes thereon;
   second converging means for subdividing the second laser beam and focusing the subdivided second laser beam on the cylindrical objects to form second micro-holes thereon;
   means for applying pressure into each of the cylindrical objects, on which the first or second micro-holes have been formed, through one end thereof;
   detector means for detecting the pressure applied into each of the cylindrical objects through one end thereof by the applying means and detecting a pressure exiting each of the cylindrical objects through the other end thereof to generate first and second detection signals which represent a state of the first and second micro-holes, respectively, on the cylindrical objects; and
   processing means for processing the first and the second detection signals to generate a drive signal and driving the moving means responsive to the drive signal to move the dividing means to a position where the first and the second micro-holes formed on the cylindrical objects are substantially similar.

11. The apparatus of claim 10, wherein each of the cylindrical objects is a cigarette around which a paper roll is pasted and to which a filter is attached, and the first and second micro-holes are formed on the outer circumference of the filter of the cigarette.

12. The apparatus of claim 10, wherein the dividing means includes first and second reflecting faces by which the first and the second laser bam are reflected.

13. The apparatus of claim 11, wherein the first converging means includes a first rotary body having a plurality of reflecting surfaces, for subdividing the first laser beam and lenses for converging the subdivided first laser beam onto the cylindrical objects and the second converging means includes a second rotary body having a plurality of reflecting surfaces, for subdividing the second laser beam and lenses for converging the subdivided second laser beam onto the cylindrical objects.

14. The apparatus of claim 10, wherein the pressure applying means includes means for applying a pre-pressure to the cylindrical objects and means for applying a measuring pressure to the cylindrical objects.

15. The apparatus of claim 10, further comprising:
   first means for rotating the cylindrical objects around an axis thereof whle holding the cylindrical objects to enable the first micro-holes to be formed on the rotating cylindrical objects by the subdivided first laser beam; and
   second means for rotating the cylindrical objects around an axis thereof while holding the cylindrical objects to enable the second micro-holes to be formed on the rotating cylindrical objects by the subdivided second laser beam.

16. The apparatus of claim 15, wherein said first and second mean for rotating include,
   a first mechanism for rotating the first rotating means around the center axis thereof; and
   a second mechanism for rotating the second rotating means around the center axis thereof.

17. The apparatus of claim 10, further comprising:
   means for alternately carrying the cylindrical objects on which the first micro-holes have been formed and the cylindrical objects on which the second micro-holes have been formed to the pressure applying means.

18. The apparatus of claim 17, wherein the carrying means includes holding members contacting both ends of the cylindrical members to hold the cylindrical members therebetween.

19. The apparatus of claim 18, wherein each of the holding members include passages through which pressure is generated.

20. The apparatus of claim 10, wherein the moving means moves the dividing means in a range defined by first and second positions.

21. The apparatus of claim 10, wherein the processing means deenergizes the moving means to stop the dividing means when the dividing means reaches a first or second position and energizes the moving means to move the dividing means from one of the first and the second positions.

22. The apparatus of claim 10, wherein the processing means includes means for arithmetically calculating a dilution value which represents a state of the first and second micro-holes formed on each of the cylindrical objects, using detected pressures applied to and exiting from each of the cylindrical objects.

23. The apparatus of claim 22, wherein the processing means includes means for calculating an average of the dilution values for each of the cylindrical objects.

24. The apparatus of claim 22, wherein the processing means includes:
   means for comparing a first dilution value which represents the state of the first micro-holes with a second dilution which represents the state of the second micro-holes.

25. An apparatus for forming micro-holes on cylindrical objects comprising:
   means for generating an input laser beam;
   means for dividing the input laser beam into first and second laser beams;
   means for moving the dividing means to change the ratio at which the laser beam is divided to first and second laser beams;
   first and second detector means for detecting portions of the first and the second laser beams, respectively to generate first and second electric signals;
   first converging means for subdividing the remaining portion of the first laser beam and converging the subdivided first laser beam onto the cylindrical objects to form first micro-holes thereon;

second converging means for subdividing the remaining portion of the second laser beam and converging the subdivided second laser beam onto the cylindrical objects to form second micro-holes thereon;

means for applying pressure into each of the cylindrical objects on which the first or second micro-holes have been formed, through one end thereof;

pressure detector means for detecting the pressure applied into each of the cylindrical objects through one end thereof by the pressure applying means and detecting a pressure exiting each of the cylindrical objects through the other end thereof to generate first and second detection signals which represent a state of the first and second micro-holes, respectively, on the cylindrical objects; and processing means for processing the first and second electric signals from the first and second detector means to generate a first drive signal and processing the first and second detection signals from the pressure detector means to generate a second drive signal, selecting one of the first and second drive signals and driving the moving means responsive to the selected one of the drive signals to move the dividing means to a position where the first and second laser beams are of substantially equal intensity.

26. The apparatus of claim 25, wherein each of the cylindrical objects is a cigarette around which a paper roll is pasted and to which a filter is attached and the micro-holes are formed on the outer circumference of the filter of the cigarette.

27. The apparatus of claim 25, wherein the dividing means includes first and second reflecting faces by which the first and the second laser beams are reflected.

28. The apparatus according to claim 26, further comprising:
first means for detecting the portion of the first laser beam sent from the dividing means to the first detector means and directing the remaining portion of the first laser beam to the first converging means; and
second means for directing the portion of the second laser beam sent from the dividing means to the second detector means and directing the remaining portion of the second laser beam to the second converging means.

29. The apparatus of claim 25, wherein the first converging means includes a first rotary body having a plurality of reflecting surfaces, for subdividing the portin of the first laser beam and lenses for converging the subdivided first laser beam onto the cylindrical objects and the second converging means includes a second rotary body having a plurality of reflecting surfaces for subdividing the second laser beam and lenses for converging the subdivided second laser beam onto the cyindrical objects.

30. The apparatus of claim 25, wherein the pressure applying means includes means for applying a pre-pressure to the cylindrical objects and means for applying a measuring pressure to the cylindrical objects.

31. The apparatus according to claim 26, further comprising:
first means for rotating the cylindrical objects around an axis thereof while holding the cylindrical objects to enable the first micro-holes to be formed on the rotating cylindrical objects by the first laser beam; and
second means for rotating the cylindrical objects around an axis thereof while holding athe cylindrical objects to enable the second micro-holes to be formed on the rotating cylindrical objects by the second laser beam.

32. The apparatus of claim 31, wherein said first and second rotating means include,
a first mechanism for rotating the first rotating means around the center axis thereof; and
a second mechanism for rotating the second rotating means around the center axis thereof.

33. The apparatus of claim 26, further comprising:
means for alternately carrying the cylindrical objects on which the first micro-holes hve been formed and the cylindrical objects or which the second micro-holes have been formed to the pressure applying means.

34. The apparatus of claim 33, wherein the carrying means includes members contacting both ends of the cylindrical members to hold the cylindrical members therebetween.

35. The apparatus of claim 34, wherein each of the holding members includes passages through which pressure is generated.

36. The apparatus of claim 25, wherein the processing means includes means for comparing the first detection signal with the second detection signal and means for maintaining their levels at substantially equal values.

37. The apparatus of claim 25, wherein the moving means moves the dividing means in a range defined by the first and second positions.

38. The apparatus of claim 37, wherein the processing means deenergizes the moving means to stop the dividing means when the dividing means reaches its first or second position, and energizes the moving means to move the dividing means from one of the first and the second positions.

39. The apparatus of claim 25, wherein the processing means includes means for arithmetically calculating a dilution value which corresponds to the first and second detection signals from the pressure detector means, which represent a state of the micro-holes formed on each of the cylindrical objects, using detected pressures applied to and exiting from each of the cylindrical objects.

40. The apparatus of claim 37, wherein the processor means includes means for calculating an average of the dilution values for each of the cylindrical objects.

41. The apparatus of claim 37, wherein the processing means further includes:
means for comparing a first dilution value which corresponds to the first micro-holes with a second dilution value which corresponds to the second micro-holes.

* * * * *